United States Patent
McDonald et al.

(10) Patent No.: US 10,345,448 B2
(45) Date of Patent: Jul. 9, 2019

(54) USING SPACE BASED AUGMENTATION SYSTEM (SBAS) EPHEMERIS SIGMA INFORMATION TO REDUCE GROUND BASED AUGMENTATION SYSTEMS (GBAS) EPHEMERIS DECORRELATION PARAMETER

(71) Applicant: Honeywell International Inc., Morris Plains, NJ (US)

(72) Inventors: James Arthur McDonald, Minneapolis, MN (US); Kim A. Class, Andover, MN (US); Bruce G. Johnson, Shoreview, MN (US)

(73) Assignee: Honeywell International Inc., Morris Plains, NJ (US)

( * ) Notice: Subject to any disclaimer, the term of this patent is extended or adjusted under 35 U.S.C. 154(b) by 710 days.

(21) Appl. No.: 15/003,545

(22) Filed: Jan. 21, 2016

(65) Prior Publication Data

US 2017/0212241 A1    Jul. 27, 2017

(51) Int. Cl.
*G01S 19/02* (2010.01)
*G01S 19/08* (2010.01)
(Continued)

(52) U.S. Cl.
CPC .............. *G01S 19/02* (2013.01); *G01S 19/07* (2013.01); *G01S 19/08* (2013.01); *G01S 19/41* (2013.01)

(58) Field of Classification Search
CPC .......... G01S 19/02; G01S 19/07; G01S 19/08; G01S 19/41; B60R 25/04; B60R 25/102; B60R 25/104
(Continued)

(56) References Cited

U.S. PATENT DOCUMENTS 5,323,322 A    6/1994    Mueller et al.
5,621,646 A    4/1997    Enge et al.
(Continued)

FOREIGN PATENT DOCUMENTS

| CN | 101839986 | 9/2010 |
| EP | 2784544 | 10/2014 |
| IN | 244673 | 12/2010 |

OTHER PUBLICATIONS

Circiu et al., "Evaluation of Dual Frequency GMAS Performance using Flight Data", "Proceedings of the Ion ITM", 2014, pp. 1-12.
(Continued)

*Primary Examiner* — Harry K Liu
(74) *Attorney, Agent, or Firm* — Fogg & Powers LLC

(57) ABSTRACT

A method of using space based augmentation system (SBAS) ephemeris data in conjunction with a ground based augmentation systems (GBAS) station is provided. The method includes integrating a space based augmentation system (SBAS) receiver in the GBAS station; receiving an industry-standard message type via the SBAS receiver at the GBAS station; consuming, at the GBAS station, the SBAS ephemeris data from the industry-standard message type associated with satellites in view of the GBAS station. The industry-standard message type includes SBAS ephemeris data associated with satellites in a global navigation satellite system (GNSS). The method further includes, based on the consuming, improving error bounds to GBAS broadcast ephemeris decorellation parameters broadcast from the GBAS station and reducing time to reintroduce a satellite in the GNSS.

20 Claims, 9 Drawing Sheets

(51) Int. Cl.
*G01S 19/07* (2010.01)
*G01S 19/41* (2010.01)

(58) Field of Classification Search
USPC .................................................. 342/357.395
See application file for complete search history.

(56) References Cited

U.S. PATENT DOCUMENTS

| | | | |
|---|---|---|---|
| 5,631,838 | A | 5/1997 | Ishikawa et al. |
| 5,828,336 | A | 10/1998 | Yunck et al. |
| 6,356,232 | B1 | 3/2002 | Rocken et al. |
| 6,407,700 | B1 | 6/2002 | Giffard |
| 6,639,549 | B2 | 10/2003 | Vanderwerf et al. |
| 6,781,542 | B2 | 8/2004 | Hoven |
| 6,801,854 | B1 | 10/2004 | Pemble et al. |
| 6,826,476 | B2 | 11/2004 | Ahlbrecht et al. |
| 6,862,526 | B2 | 3/2005 | Robbins |
| 7,117,417 | B2 | 10/2006 | Sharpe et al. |
| 7,256,730 | B2 | 8/2007 | Hernandez-Pajares et al. |
| 7,289,061 | B2 | 10/2007 | Komjathy et al. |
| 7,973,706 | B2 | 7/2011 | Suzuki |
| 8,085,196 | B2 | 12/2011 | Whitehead |
| 8,106,823 | B2 | 1/2012 | Schroth |
| 8,131,463 | B2 | 3/2012 | Lopez et al. |
| 8,203,482 | B2 | 6/2012 | Azaola Saenz |
| 8,305,266 | B2 | 11/2012 | Damidaux et al. |
| 8,344,946 | B2 | 1/2013 | Um et al. |
| 8,599,065 | B2 | 12/2013 | Rodriguez et al. |
| 8,847,820 | B2 | 9/2014 | Landau et al. |
| 2004/0088111 | A1* | 5/2004 | Ahlbrecht ............. G01S 5/0009 701/471 |
| 2005/0212696 | A1 | 9/2005 | Bartone et al. |
| 2010/0033370 | A1* | 2/2010 | Lopez ..................... G01S 19/08 342/357.29 |
| 2011/0050492 | A1 | 3/2011 | Um et al. |
| 2011/0291887 | A1 | 12/2011 | Pulford |
| 2012/0206298 | A1 | 8/2012 | Alanen et al. |
| 2012/0208557 | A1 | 8/2012 | Carter |
| 2012/0293367 | A1 | 11/2012 | Chen et al. |
| 2014/0062765 | A1 | 3/2014 | Brenner |
| 2014/0163938 | A1 | 6/2014 | Sparks et al. |
| 2014/0292573 | A1 | 10/2014 | Drescher et al. |
| 2015/0145722 | A1 | 5/2015 | Johnson et al. |
| 2015/0257152 | A1* | 9/2015 | Hasegawa ............. H04W 16/14 370/329 |
| 2016/0282470 | A1 | 9/2016 | McDonald et al. |
| 2016/0377730 | A1 | 12/2016 | Drescher et al. |
| 2017/0070971 | A1* | 3/2017 | Wietfeldt ............. H04W 64/00 |
| 2017/0227648 | A1 | 8/2017 | Johnson et al. |

OTHER PUBLICATIONS

Jung et al., "Long-term ionospheric anomaly monitoring for ground based augmentation systems", "Radio Science", Jul. 25, 2012, pp. 1-26, vol. 47, No. 4, Publisher: retrieved from http://onlinelibrary.wiley.com/doi/10.1029/2012RS005016/full.
Konno, "Dual-Frequency Smoothing for CAT III LAAS: Performance Assessment Considering Ionosphere Anomalies", "Proceedings of the 20th International Technical Meeting of the Satellite Division of the Institute of Navigation (ION GNSS 2007)", 2007, pp. 1-14.
Lee et al., "Assessment of Nominal Ionosphere Spatial Decorrelation for LAAS", "Proceedings of IEEE/ION PLANS 2006", Apr. 27, 2006, pp. 506-514.
Lee et al., "Position-Domain Geometry Screening to Maximize LAAS Availability in the Presence of Ionosphere Anomalies", Jul. 14, 2011, pp. 1-16.
Lee et al., "Position-Domain Geometry Screening to Maximize LAAS Availability in the Presence of Ionosphere Anomalies", "ION GNSS 19th International Technical Meeting of the Satellite Division", 2006, pp. 1-16.
Majithiya et al., "Indian Regional Navigation Satellite System", "InsideGNSS", Jan./Feb. 2011, pp. 40-46.
Nomura et al., "GPS Orbit Determination using Several Reference", "SICE Annual Conference", Sep. 17-20, 2007, pp. 1770-1773, Published in: Japan.
Park et al., "Mitigation of Anomalous Ionosphere Threat to Enhance Utility of LAAS Differentially Corrected Positioning Service (DCPS)", "Proceedings of IEEE/ION Plans 2008", May 8, 2008, pp. 285-293.
Pullen et al., "The Impact and Mitigation of Ionosphere Anomalies on Ground-Based Augmentation of GNSS", "12th International Ionospheric Effects Symposium (IES 2008), Session 4A, Paper #6", May 14, 2008, pp. 1-24, Publisher: Stanford University.
Pullen et al., "Using SBAS to Enhance GBAS User Availability: Results and Extensions", "Use of External Information in GBAS", Nov. 12, 2010, pp. 124, Published in: JP.
Pullen at al., "Using SBAS to Enhance GBAS User Availability: Results and Extensions to Enhance Air Traffic Management (EIWAC 2010)", 2010, pp. 1-11, Publisher: Dept. of Aeronautics and Astronautics at Stanford University, Published in: US.
Ramakrishnan et al., "Targeted Ephemeris Decorrelation Parameter Inflation for Improved LAAS Availability during Severe Ionosphere Anomalies", "Proceedings ION NTM", 2008, pp. 1-13.
Rife et al., "WAAS-Based Threat Monitoring for a Local Airport Monitor (LAM) That Supports Category I Precision Approach", Apr. 25-27, 2006, pp. 468-482, Publisher: Illinois Institute of Technology, Published in: US.
Simili et al., "Code-Carrier Divergence Monitoring for the GPS Local Area Augmentation System", "IEEE/ION Position, Location, and Navigation Symposium 2006", 2006, pp. 483-493.
Sunehra, "Real-Time Estimation of Ionospheric Delay Using Dual Frequency GPS Observations", "European Scientific Journal", May 2013, pp. 36-50, vol. 9 15.
Suzuki et al., "Evaluation of Dual-Frequency GBAS Performance using Data from Public Receiver Networks", "Proceedings of the 23rd International Technical Meeting of the SAtellite Division of the Institute of Navigation (ION GNSS 2010)", Sep. 21-24, 2010, pp. 1-11.
Takeyasu et al., "3-1-2 Air Navigation with Global Navigation Satellite Systems and the Ionospheric Effects", "Journal of the National Institute of Information and Communications Technology", 2009, pp. 231-242, vol. 56, No. 1-4.
European Patent Office, "Communication Pursuant to Article 94(3) from EP 17151490.4 dated Mar. 15, 2018", "from Foreign Counterpart to U.S. Appl. No. 15/003,545", Dated Mar. 15, 2018, pp. 1-5, Published in: EP.
U.S. Patent and Trademark Office; Supplemental Notice of Allowability dated Mar. 26, 2018; U.S. Appl. No. 15/019,840; pp. 1-3.
European Patent Office, "Extended European Search Report for EP Application No. 17151490.4", "From Foreign Counterpart to U.S. Appl. No. 15/003,545", filed Jun. 22, 2017, pp. 1-11, Published in: EP.
European Patent Office, "Extended European Search Report for EP Application No. 17151893.9 dated Jun. 28, 2017", "Foreign Counterpart to U.S. Appl. No. 15/019,840", filed Jun. 28, 2017, pp. 1-12, Published in: EP.
Joerger et al., "Analysis of Iridium-Augmented GPS for Floating Carrier Phase Positioning", "Navigation: Journal of the Institute of Navigation", Sep. 1, 2010, pp. 137-160, vol. 57, No. 2, Publisher: Institute of Navigation, Published in: Fairfax, VA, US.
Pervan et al., "Orbit Ephemeris Monitors for Local Area Differential GPS", "NTM 2008—Proceedings of the 2008 National Technical Meeting of the Institute of Navigation", Oct. 30, 2008, pp. 359-362, Publisher: The Institute of Navigation.
Walter et al., "The Advantages of Local Monitoring and VHF Data Broadcast for SBAS", "Proceedings of the European Navigation Conference GNSS", Jul. 19-22, 2005, pp. 1-15, Published in: Munich, Germany.
Wen et al., "Integrating WAAS into LAAS to Improve the Integrity of LAAS", "GNSS 2005—Proceedings of the 18th International Technical Meeting of the Satellite Division of the Institute of Navigation (ION GNSS 2005)", Sep. 16, 2005, pp. 2855-2856, Publisher: The Institute of Navigation.

(56) References Cited

OTHER PUBLICATIONS

Wikipedia, "Wide Area Augmentation System", "Retrieved from the URL: https://en.wikipedia.org/w/index.php?title=Wide_Area_Augmentation_System&oldid=699233498", Jan. 11, 2016, pp. 1-13.
Unite States Patent and Trademark Office, "Notice of Allowance for U.S. Appl. No. 15/019,840", dated Jan. 24, 2018, pp. 1-20, Published in: US.
European Patent Office; "Communication under Rule 71(3) from EP Application No. 17151490.4, dated Oct. 15, 2018"; from Foreign Counterpart of U.S. Appl. No. 15/003,545; pp. 1-36; Dated: Oct. 15, 2018; Published: EP.

* cited by examiner

USING SPACE BASED AUGMENTATION SYSTEM (SBAS) EPHEMERIS SIGMA INFORMATION TO REDUCE GROUND BASED AUGMENTATION SYSTEMS (GBAS) EPHEMERIS DECORRELATION PARAMETER

BACKGROUND

Global Navigation Satellite Systems (GNSS) provide aircraft with navigation support in approach and landing operations. However, since the accuracy and precision requirements are high in approach and landing operations, Ground Based Augmentation Systems (GBAS) augment GNSS when an aircraft is near a GBAS Ground Subsystem. GBAS Ground Subsystems, also referred to herein as GBAS stations, augment GNSS receivers by broadcasting pseudorange corrections and integrity information to the aircraft, which helps remove GNSS errors impacting satellite measurements processed by the aircraft's GNSS receiver. As a result, aircraft can have improved continuity, availability, and integrity performance for precision approaches, departure procedures, and terminal area operations.

Ground Based Augmentation Systems (GBAS) are susceptible to spatial decorrelation errors between the ground subsystem (providing GPS corrections) and airborne subsystems (consuming GPS corrections) due to GPS satellite ephemeris faults. This ephemeris fault threat is mitigated via a ground broadcast ephemeris decorrelation parameter, which is applied in the airborne subsystem's integrity limit computations. The ground subsystem continually monitors (in real-time) this broadcast decorrelation parameter to ensure the broadcast value provides valid integrity bounding for the aircraft's navigation position solution.

Currently available GBAS stations include a first order hold (FOH) and maneuver detector monitors (MDM), which utilize stored ephemeris data as part of their real-time monitoring capability. The FOH and/or the MDM are tripped (i.e., triggered) when ephemeris data for a particular satellite is bad (faulty). When this occurs, the data saved for the faulty satellite, which has been accumulating for prior days, is eliminated and the faulty satellite is not used for the next two days. Taking one satellite off-line for two days could potentially cause loss of function of the GBAS station. If there are not enough satellites to give a good solution, the bounding error becomes large. Large bounding errors impact continuity and available requirements.

When a satellite is reintroduced to a satellite system (i.e., the satellite's status transitions from invalid to valid), the GBAS station is required to wait at least twenty-four hours for the ephemeris buffer to be filled.

When a GBAS station is brought on-line after being off-line for more than twenty-four hours, the GBAS station must wait for the ephemeris buffers for each satellite in view of the GBAS station to be filled with at least twenty-fours of data before that satellite can be used by the GBAS station. Likewise, if a GBAS station is out of commission for more than one day, the GBAS station must wait for the ephemeris buffers for each satellite in view of the GBAS station to be filled with at least twenty-fours of data before that GBAS station can be used.

SUMMARY

The present application relates to a method of using space based augmentation system (SBAS) ephemeris data in conjunction with a ground based augmentation systems (GBAS) station. The method includes integrating a space based augmentation system (SBAS) receiver in the GBAS station; receiving an industry-standard message type via the SBAS receiver at the GBAS station; consuming, at the GBAS station, the SBAS ephemeris data from the industry-standard message type associated with satellites in view of the GBAS station. The industry-standard message type includes SBAS ephemeris data associated with satellites in a global navigation satellite system (GNSS). The method further includes, based on the consuming, improving error bounds to GBAS broadcast ephemeris decorrelation parameters broadcast from the GBAS station and reducing time to reintroduce a satellite in the GNSS.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
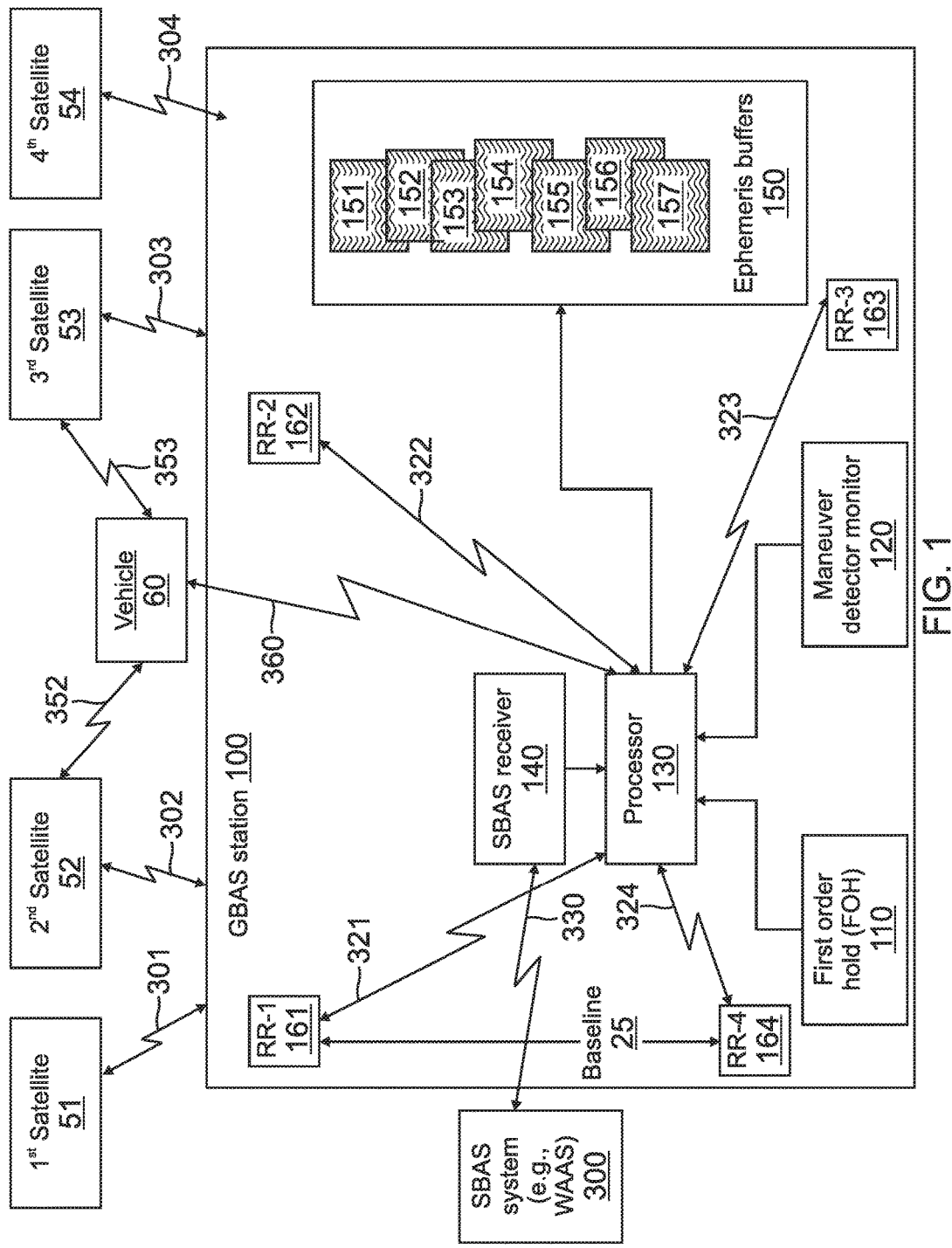
FIG. 1 shows an embodiment of a GBAS station in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In exemplary embodiments, Global Navigation Satellite Systems (GNSS) described herein include the United States' Global Positioning System (GPS) and Wide Area Augmentation System (WAAS), Russia's Global'naya Navigatsionnaya Sputnikovaya Sisterna (GLONASS), China's Beidou and Compass, the European Union's Galileo and European Geostationary Navigation Overlay Service (EGNOS), India's Indian Regional Navigational Satellite System (IRNSS), and Japan's Quasi-Zenith Satellite System (QZSS). In exemplary embodiments implementing GPS, L1 signals (operating around 1.57542 GHz) and/or L2 signals (operating around 1.2276 GHz) and/or L5 signals (operating around 1.17645 GHz) are implemented. In exemplary embodiments implementing GLONASS, SP signals at a first frequency (operating around 1.602 GHz) and/or SP signals at a second frequency (operating around 1.246 GHz) are implemented. In exemplary embodiments implementing COMPASS, B1 signals (operating around 1.561098 GHz), B1-2 signals (operating around 1.589742), B2 signals (operating around 1.20714 GHz) and/or B3 signals (operating around 1.26852 GHz) are implemented. In exemplary embodiments implementing Galileo, E5a and E5b signals (operating around 1.164-1.215 GHz), E6 signals (operating around 1.260-1.500 GHz), and/or E2-L1-E11 signals (operating around 1.559-1.592 GHz) are implemented.

GPS does not provide the accuracy and the integrity levels needed to land an aircraft. Ground Based Augmentation Systems (GBAS) can enable improved continuity, availability, and integrity performance for precision approaches, departure procedures, and terminal area operations. GBAS supports CAT1 (200 feet decision height) for aircraft approach operations. GBAS provides very high frequency (VHF) uplinks to provide error correction information to an aircraft on approach to a runway. The differential range error corrections broadcast by the ground station improve GPS accuracy while ranging sources (i.e., satellites) are monitored to ensure integrity. GBAS is generally limited to the property of a single airport.

Two of the numerous errors that require error bounding are spatially decorrelated iono error and the spatially decorrelated ephemeris error. A spatially decorrelated error is an error that increases as the distance between the aircraft and the GBAS station increases. This application provides methods and systems to improve the error bounding for the ephemeris error.

Ephemeris error, which is also referred to as satellite positional errors, is the difference between the actual satellite position and the reported position of the satellite. The ephemeris error is calculated as follows. The satellites in the GNSS transmit signals at precise times and the GBAS station measures how long it takes the satellite signal to reach the receiver on the ground. The satellites also transmit ephemeris data (i.e., ephermites), which provide a very accurate description of the orbital position of the satellite over time. Given the time delay to receive the signal at the GBAS station and the known satellite position in space from the ephemeris data, the distance to satellite is computed. The GPS control system periodically updates ephemeris data for each satellite in the GNSS. Typically, the GPS control system updates ephemeris data every few hours.

If there is an ephemeris error, the difference in the actual satellite position and ephemeris based position could result in unacceptably large errors associated with the GBAS station's broadcast differential corrections. Therefore the GBAS station broadcasts an error bounding for ephemeris errors, and performs real-time monitoring to ensure this broadcast error bounding is valid.

Error bounding is accomplished through real time estimations of the potential threat to the airborne receiver in a vehicle (e.g., an aircraft). Bounding the airborne position is important when performing precision approaches. The information uplinked to the vehicle is used for bounding error sources to enable the airborne user to compute a protection level bounding. The protection level bounding is compared to an alert limit. If the aircraft exceeds the alert limit, the aircraft does not land but goes around (i.e., initiates a go-around and has a missed approach) since the safety may not be met. Typically, in prior art systems, the protection level is inflated to represent worst case error conditions. Over inflation of the protection level is known to result in unnecessary missed approaches.

Current technology is limited in how well the level of bounding needed for these two error sources is identified because the observables at GBAS station are collocated (i.e. reference receivers are not that far apart).

FIG. 1 shows a ground based augmentation system (GBAS) station 100 in accordance with the present application. As shown in FIG. 1, four satellites 51-54 are in view of the GBAS station 100. The GBAS station 100 includes at least one processor 130, at least four GBAS reference receivers 161-164, at least one monitor 110/120 to detect ephemeris fault threats, a space based augmentation system (SBAS) receiver 140, and ephemeris buffers 151-157 for the satellites in the GNSS, which are shown generally as ephemeris buffers 150. In one implementation of this embodiment, the ephemeris buffers store twenty-four hours of data (i.e., one-day ephemeris buffers). In another implementation of this embodiment, the ephemeris buffers store forty-eight hours of data (i.e., two-day ephemeris buffers). In another implementation of this embodiment, the ephemeris buffers store more than forty-eight hours of data.

The at least one processor 130 (also referred to herein as processor 130) continually updates at least a portion of the ephemeris buffers 151-157 with ephemeris data for a respective at least a portion of the satellites in the GNSS. The ephemeris buffers 151-157 hold ephemeris data for all the satellites in the GNSS. The processor 130 adds the latest ephemeris data and the oldest ephemeris data is dropped from the ephemeris buffer. The processor 130 inputs the ephemeris data for the first satellite 51 to the first ephemeris buffer 151, the ephemeris data for the second satellite 52 to the second ephemeris buffer 152, the ephemeris data for the third satellite 53 to the first ephemeris buffer 153, and so forth.

The at least four GBAS reference receivers 161-164 (also referred to herein as reference receivers 161-164) are communicatively coupled to the processor 130 via respective communication links 321, 322, 323, and 324. The reference receivers 161-164 process GPS satellite signals and then transmit data to the processor 140 via communication links 321, 322, 323, and 324. In one implementation of this embodiment, the communication links 321, 322, 323, and 324 are a databus. The processor 130 processes the data input from the reference receivers 161-164 to generate GBAS ephemeris data. The communication links 321, 322, 323, and 324 can be a hard wire communication link or a wireless communication link. Pairs of the reference receivers 161-164 are separated from each other by a baseline. The baseline between the first reference receiver 161 and the fourth reference receiver 164 is indicated as baseline 25.

An SBAS system 300, which is external to the GBAS station 100, is communicatively coupled to the SBAS receiver 140 via communication link 330. The communication link 330 is a wireless communication link or a mixed wireless/hardwire communication link. In the United States, an SBAS system, which is referred to a Wide Area Augmentation System (WAAS), has ground based reference receivers all over the country and in portions of Canada and Mexico. The data from the SBAS system 300 is communicated to the SBAS receiver 140 via geosynchronous satellites (GEOs). The reference receivers can observe and identify if there is a fault with any satellite ephemeris data to reduce the error bounding that is uplinked to the vehicle. The SBAS receiver 140 is communicatively coupled to the processor 130. The SBAS receiver 140 outputs ephemeris uncertainty data from the SBAS system 300 to the processor 130. The processor 130 processes the ephemeris uncertainty data input from the SBAS receiver 140 to generate SBAS-based ephemeris decorrelation parameter from the ephemeris uncertainty data. The at least one monitor 110/120 detects ephemeris fault threats. The at least one monitor 110/120 sends information indicative of the ephemeris fault threats to the processor 130. As shown in FIG. 1, the at least one monitor 110/120 include a first order hold (FOH) 110 and at least one maneuver detector monitor (MDM) 120. The FOH 110 and MDM 120 observe different components of the ephemeris fault threat space. Typically, a GBAS station 100 includes both the FOH 110 and MDM 120.

The processor 130 computes GBAS broadcast ephemeris decorrelation parameters for the satellites 51-54 in the GNSS that are in view of the GBAS station 100 based on either: 1) an SBAS ephemeris standard deviation input to the processor 130 from an industry-standard message type; or 2) GBAS ephemeris standard deviation inputs provided to the processor 130 by the reference receivers 161-164. In one implementation of this embodiment, the processor 130 computes GBAS broadcast ephemeris decorrelation parameters for all the satellites in the GNSS (or a subset of the satellites in the GNSS), regardless of whether they are in view of the GBAS station 100 or not.

The industry-standard message type includes SBAS ephemeris data associated with all the satellites in the GNSS and an assumed distance to all the respective satellites in the GNSS. In one implementation of this embodiment, the industry-standard message type is a message type 28 which, as know to one skilled in the art, as a Clock-Ephemeris Covariance Matrix Message used in Wide area augmentation system in the United States. The technology described herein can also be implemented with other message types that are or will become an industry standard to provides ephemeris data to GBAS stations.

A vehicle 60 is communicatively coupled to the GBAS station 100 via wireless communication link 360, and is communicatively coupled to the satellites 51-54 in view of the vehicle 60. For example, as shown in FIG. 1, the vehicle 60 is communicatively coupled to the second satellite 52 via communication link 352 and is communicatively coupled to the third satellite 53 via communication link 353. The other communication links to first satellite 51 and fourth satellite 54 are not shown for ease of viewing FIG. 1. The four satellites 51-54 shown in the Figures herein are a subset of all the satellites in the GNSS. In one implementation of this embodiment, the vehicle 60 is an aircraft.

In one implementation of this embodiment, processor 130 continually updates the ephemeris buffers 151-157 with GBAS ephemeris data from the GBAS reference receivers 161-164 unless a satellite is determined to be off-line (e.g., is being repositioned) or has faulty GBAS ephemeris data. The exemplary methods to update the ephemeris buffer for reintroduced or faulty satellite are described in detail below. In another implementation of this embodiment, the processor 130 continually determines which of the ephemeris uncertainty data computed based on ephemeris data from the GBAS reference receivers 161-164 or the SBAS ephemeris uncertainty data from the industry-standard message type is the better data ephemeris buffer. In this latter case, the processor 130 evaluates each data source and selects the source that the better satisfies a selected quality metric, a plurality of selected quality metrics, or at least one of a selected quality metric. In one implementation of this embodiment, the processor 130 selects the data with the lowest uncertainty value.

Figure 2:
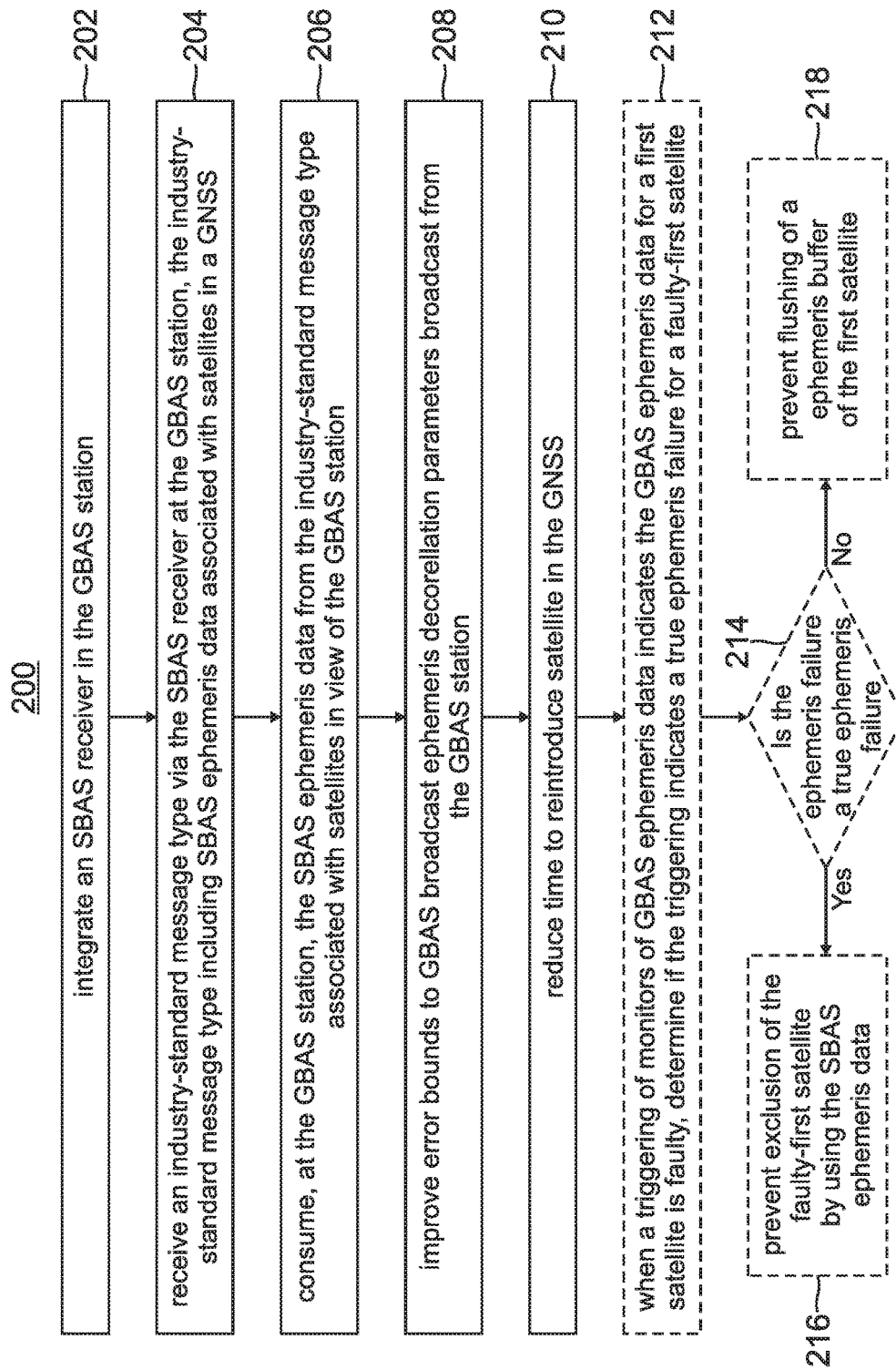
FIG. 2 shows a flow diagram of an exemplary embodiment of a method of using space based augmentation system (SBAS) ephemeris data in conjunction with a GBAS station in accordance with the present application.

FIG. 2 shows a flow diagram of an exemplary method 200 of using space based augmentation system (SBAS) ephemeris data in conjunction with the GBAS station 100 in accordance with the present application. Method 200 is described with reference to FIGS. 1 and 3-7. At block 202, an SBAS receiver 140 is integrated in the GBAS station 100. At block 204, an industry-standard message type is received via the SBAS receiver 140 at the GBAS station 100. The industry-standard message type is received from the SBAS system 300. The industry-standard message type includes SBAS ephemeris data associated with satellites in a global navigation satellite system (GNSS) and an assumed distance to the respective satellites in the GNSS.

At block 206, the GBAS station consumes the SBAS ephemeris data from the industry-standard message type associated with satellites 51-54 in view of the GBAS station 100. Based on the consuming, the processes of blocks 208, 210, 212, 216, and 218 take place as appropriate. The process at block 208 occurs for the satellites in view of the GBAS station 100 that are not faulty. The process at block 210 occurs when a satellite is being reintroduced into the GNSS. The processes at blocks 210, 212, 214, 216, and 218 occur for a satellite that has ephemeris data that triggers one or more of the at least one monitor 110/120. The process of blocks 212, 214, 216, and 218 are optional processes.

At block 208, error bounds to GBAS broadcast ephemeris decorrelation parameters broadcast from the GBAS station 100 are improved for all the satellites with correct ephemeris data in view of the GBAS station 100. The decorrelation parameters, by definition, address the spatial decorrelation between the GBAS station 100 and the vehicle user. The improvement is achieved by reducing a P-value. The P-value is a parameter broadcast from the GBAS station 100 to the vehicle 60. The vehicle 60 uses the P-value to determine their integrity limit during landing.

The GBAS station 100 takes the ephemeris standard deviation (i.e., ephemeris sigma ($\sigma$)) received via the clock-ephemeris covariance matrix data in the industry-standard message type, computes an estimated satellite position error for each satellite in view of the GBAS station 100, and divides the estimated satellite position error by the range to the respective satellite to determine the P-value. In this manner, the technology described herein improves on the prior art systems by reducing the P-value so that unnecessary missed approaches are reduced when an aircraft 60 is preparing to land. In order to improve the error bounds to GBAS broadcast ephemeris decorrelation parameters, the GBAS station 100 uses the SBAS ephemeris standard deviation (σ) to compute an SBAS minimum detectible error and also, at the same time, computes a GBAS minimum detectible error based on input from the reference receivers 161-164. The GBAS station 100 computes an SBAS P-value using the computed SBAS minimum detectible error and computes a GBAS P-value using the computed GBAS minimum detectible error. The GBAS station 100 compares the SBAS P-value to the GBAS P-value and selects to broadcast the smaller P-value from the GBAS station based on the comparison.

In one implementation of this embodiment, the processor 130 executes algorithms to determine the SBAS-based P-value and the GBAS-based P-value. In this case, the processor 130 inputs the ephemeris uncertainty data from the SBAS receiver 140, processes the ephemeris uncertainty data input from the SBAS receiver 140 to generate SBAS-based to determine the SBAS-based P-value. In this case, the processor 130 also inputs ephemeris data from each of the at least four reference receivers 161-162, determines GBAS minimum detectible errors for each of the respective satellites 51-54 in view of the GBAS station 100 from the reference receiver data, and determines the GBAS P-value.

The vehicles 60 have improved integrity bounding at greater distance from GBAS station 100 since the P-value broadcast to vehicles 60 in the vicinity of the GBAS station 100 is reduced.

In this manner, the SBAS ephemeris information is used in a GBAS station 100 to provide a mechanism to reduce the value of the GBAS broadcast ephemeris decorrelation and improve the P-value, while maintaining acceptable integrity performance.

Figure 3:
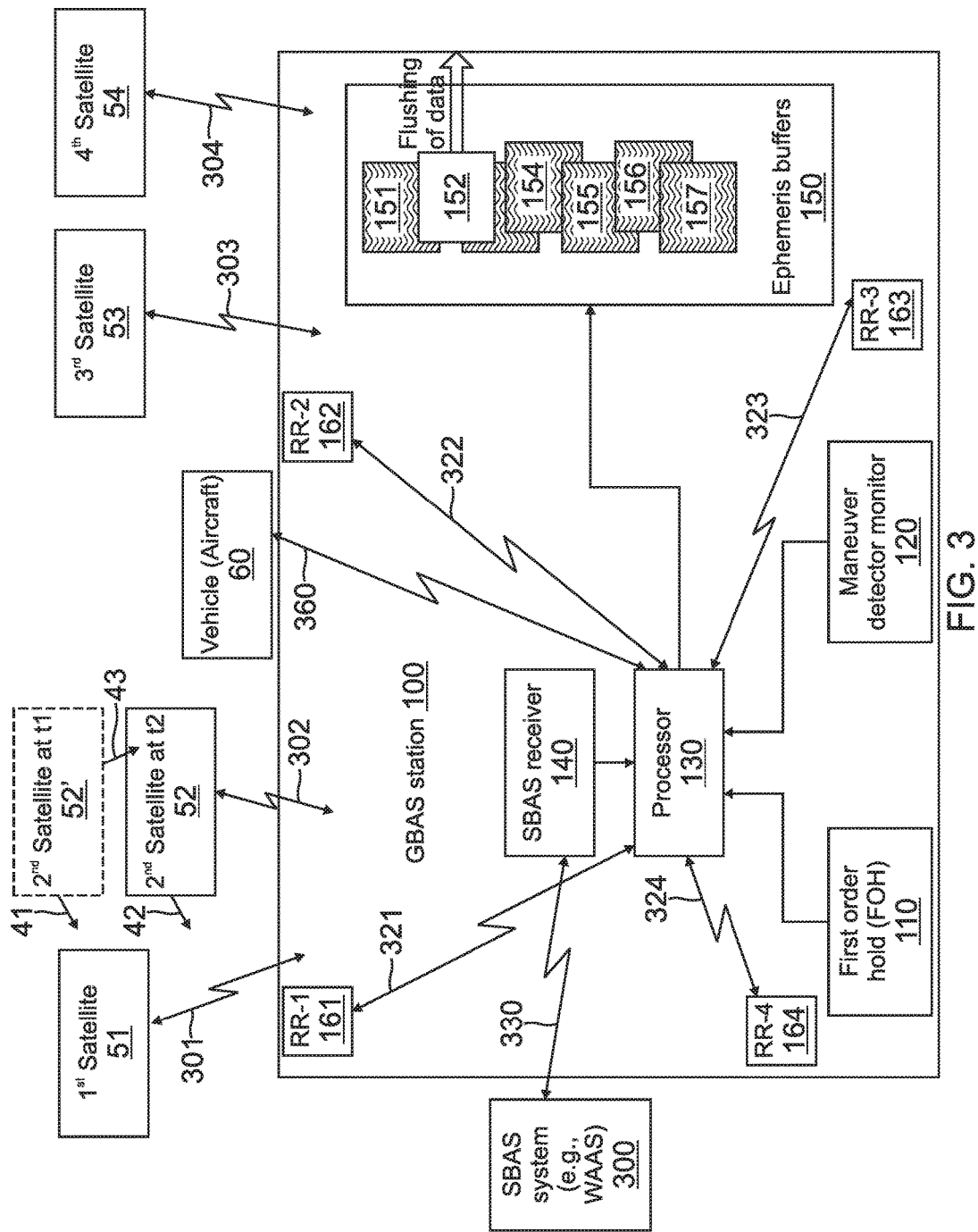
FIG. 3 shows an embodiment of a GBAS station in which a satellite is being reintroduced to the GNSS in accordance with the present application.
Figure 4:
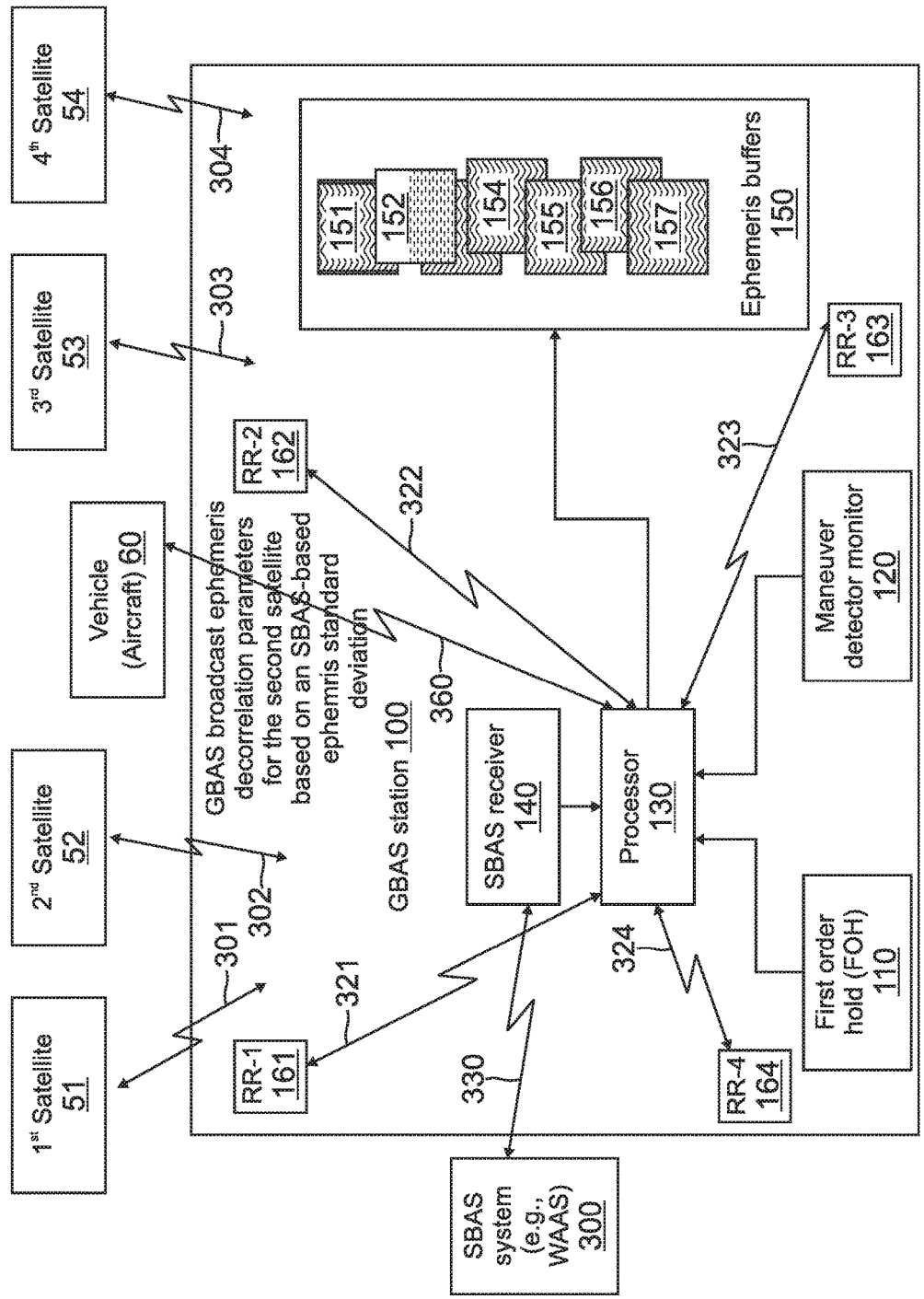
FIG. 4 shows an embodiment of a GBAS station in which the ephemeris buffer for the satellite being reintroduced to the GNSS is being filled while the GBAS station broadcasts GBAS broadcast ephemeris decorrelation parameters for the reintroduced satellite based on an SBAS ephemeris standard deviation in accordance with the present application.
Figure 5:
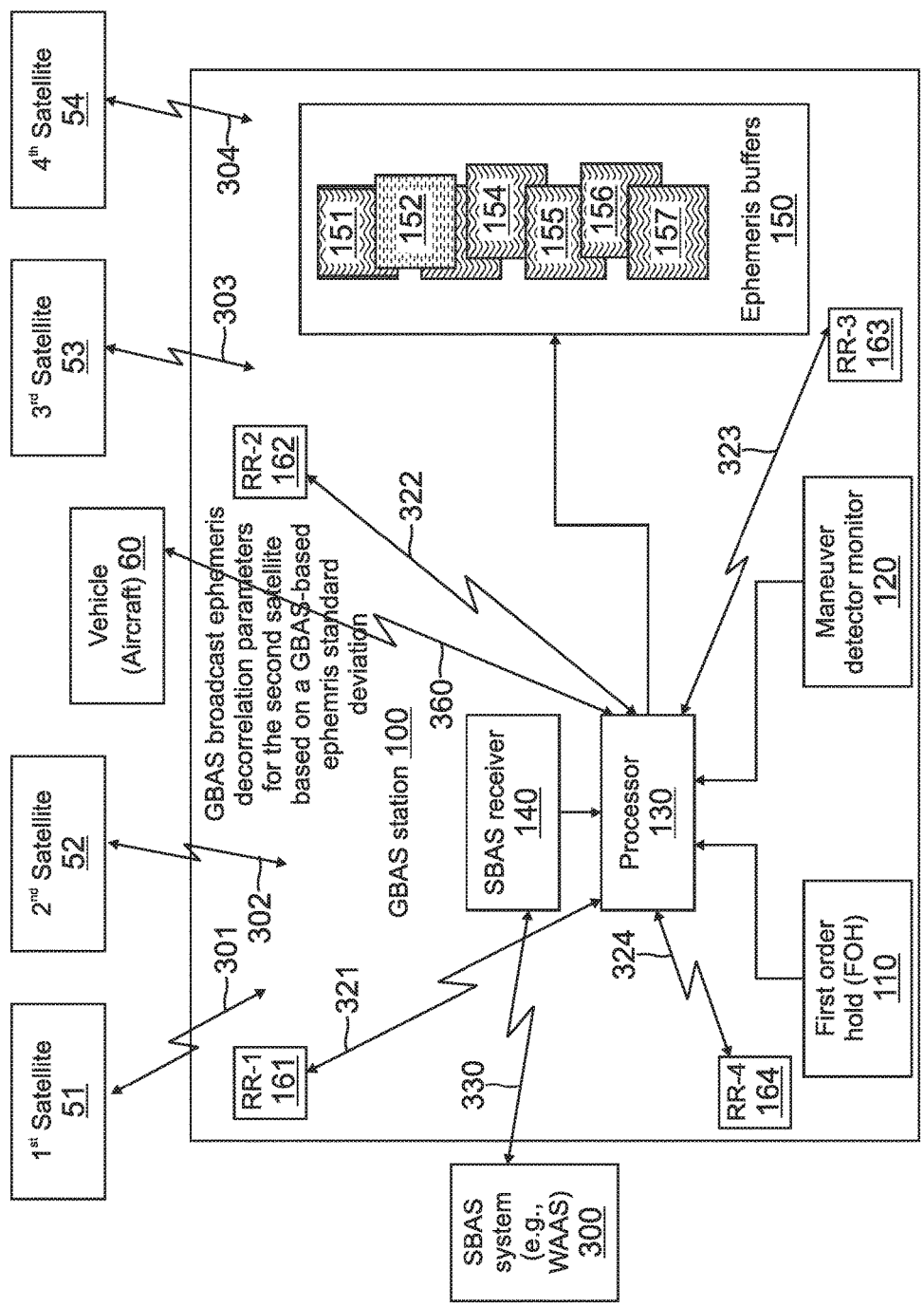
FIG. 5 shows an embodiment of a GBAS station in which the ephemeris buffer for the satellite being reintroduced to the GNSS has been filled and the GBAS station has returned to broadcasting GBAS broadcast ephemeris decorrelation parameters for the reintroduced satellite based on a GBAS ephemeris standard deviation in accordance with the present application.

At block 210, the time to reintroduce a satellite 51 in the GNSS is reduced. Block 210 is described with reference to FIGS. 3-5. FIG. 3 shows an embodiment of a GBAS station 100 in which a satellite 52 is being reintroduced to the GNSS in accordance with the present application. FIG. 4 shows an embodiment of a GBAS station 100 in which the ephemeris buffer 152 for the satellite 52 being reintroduced to the GNSS is being filled while the GBAS station 100 broadcasts GBAS broadcast ephemeris decorrelation parameters for the reintroduced satellite 52 based on an SBAS ephemeris standard deviation in accordance with the present application. FIG. 5 shows an embodiment of a GBAS station 100 in which the ephemeris buffer 152 for the satellite 52 being reintroduced to the GNSS has been filled and the GBAS station 100 returns to broadcasting GBAS broadcast ephemeris decorrelation parameters for the reintroduced satellite 52 based on a GBAS ephemeris standard deviation in accordance with the present application.

As noted above, the ephemeris data for each satellite 51-54 in a GNSS is stored in respective ephemeris buffers 151-154 at the GBAS station 100. When a satellite is moved, the ephemeris data for that satellite is flushed from the ephemeris buffer (e.g., ephemeris buffer 151) for that satellite. In prior art systems, the reintroduced satellite cannot be used by the GBAS station 100 for one to two days after the repositioning of the satellite while at least twenty-four hours of valid ephemeris data is acquired in the ephemeris buffer for that satellite. Only after the ephemeris buffer is filled with at least twenty-four hours of valid ephemeris data is that satellite reintroduced to the GNSS. The present application is not limited by this delay of at least twenty-four hours.

As shown in FIG. 3, the second satellite 52' has been moved from in a first position at time t1 to a second position at a later time t2. The original position of the second satellite is indicated by dashed block 52'. The orbital motions of the second satellite at time t1 and t2 are indicated by vectors 41 and 42 respectively. The vector 43 shows the amount and direction of the non-orbital movement of the second satellite 52 between time t1 and t2. When the second satellite 52 is moved, at least one signal to indicate that the second satellite 52 will be off-line is sent to the GBAS station 100. Based on the indication that the second satellite 52 is going off-line, the ephemeris data for second satellite 52 is flushed from the second ephemeris buffer 152 that is associated with the second satellite 52. This is indicated in FIG. 3 by the box 152 without cross-hatching. The full ephemeris buffers are shown with boxes completely filled with cross-hatching. When the second satellite 52 is in the correct position and on the correct trajectory for the required orbit at time t2, at least one signal is sent to indicate that the second satellite 52 is being reintroduced to the GNSS. The signals that a satellite is being repositioned and is being reintroduced are sent by a controller in the GNSS as is known in the art.

In one implementation of this embodiment, the reintroduced satellite is being reintroduced after a shut down of the satellite.

In prior art systems, the second satellite 52 would not be used to generate the P-values broadcast in the GBAS broadcast ephemeris decorrelation parameters for forty-eight hours after the second ephemeris buffer 152 is flushed.

The technology described herein reduces the time to reintroduce the first satellite 51 in the GNSS after the second satellite is being reintroduced in the GBAS station 100. Once the processor 130 determines the second satellite 52 is being reintroduced (e.g., the second satellite 52 was moved and is now in position to function in the GNSS), the GBAS station 100 fills the previously-flushed ephemeris buffer 152 associated with the second satellite 52 with data associated with the second satellite input from four reference receivers 161-164 in the GBAS station 100. At the same time, the GBAS station 100 computes GBAS broadcast ephemeris decorrelation parameters for the second satellite 52 being reintroduced based on an SBAS ephemeris standard deviation from the industry-standard message type.

As shown in FIG. 4, the previously-flushed ephemeris buffer 152 associated with the second satellite 52 has been partially filled with data associated with the second satellite input from four reference receivers 161-164 in the GBAS station. The partially filled ephemeris buffer 152 is indicated with partial cross-hatching in box 152. Even when there is not enough (e.g., at least twenty-four hours or forty-eight hours of) valid ephemeris data in the partially filled ephemeris buffer 152, the GBAS station 100 is able to broadcast GBAS broadcast ephemeris decorrelation parameters, which are based on the SBAS ephemeris standard deviation data for the second satellite 52, to the vehicle 60. The GBAS broadcast ephemeris decorrelation parameters for the second satellite 52 are based on the SBAS ephemeris standard deviation data while the previously-flushed ephemeris buffer 152 associated with the second satellite 52 is being filled with data associated with the second satellite input from four reference receivers 161-164 in the GBAS station. In this manner, data associated with the second satellite 52 is included in the GBAS broadcast ephemeris decorrelation parameters.

However, if an error is detected in the GBAS broadcast ephemeris decorrelation parameters from the reference receivers 161-164 for satellite 52 during the refilling process, the GBAS station 100 prevents data from that faulty second satellite 52 from being used by a vehicle 60 communicatively coupled to the GBAS station 100. In one implementation of this embodiment, the GBAS station 100 prevents data from the faulty satellite 52 from being used by the vehicle 60 by ending the broadcasting of the GBAS broadcast ephemeris decorrelation parameters for the faulty satellite 52. In another implementation of this embodiment, the GBAS station 100 prevents data from the faulty satellite 52 from being used by the vehicle 60 by flagging the GBAS broadcast ephemeris decorrelation parameters for the faulty satellite 52 so the vehicle 60 does not use that data. If an error is detected in the GBAS broadcast ephemeris decorrelation parameters for the faulty satellite 52, the second ephemeris buffer 152 is flushed again. The same process is applicable to any other faulty satellite in view of the GBAS station 100 as is described below with reference to blocks 212, 214, 216, and 218 of method 2 (FIG. 2).

As shown in FIG. 5, the previously-flushed ephemeris buffer 152 associated with the second satellite 52 has been completely filled with data associated with the second satellite input from four reference receivers 161-164 in the GBAS station and the GBAS station 100 broadcasts GBAS broadcast ephemeris decorrelation parameters for the second satellite 52 based on the GBAS ephemeris standard deviation data input from four reference receivers 161-164 in the GBAS station.

In this manner, the GBAS station 100 provides correct ephemeris data for reintroducing satellites without waiting at least twenty four hours for the ephemeris buffers for the reintroduced satellites to be at least partially filled with data from the reference receivers in the GBAS station. The GBAS station 100 described herein provides GBAS broadcast ephemeris decorrelation parameters, including data for the newly reintroduced satellite, as soon as a signal is received from the GNSS that the satellite is being reintroduced.

The GBAS station 100 can use the same processes to provide correct ephemeris data for a new satellite that is being added to the GNSS without waiting twenty four hours for the ephemeris buffers for the new satellites to be filled with data from the reference receivers in the GBAS station 100.

The technology described herein is able to provide correct ephemeris data in GBAS broadcast ephemeris decorrelation parameters for each satellite in view of a GBAS station when the GBAS station 100 is just coming back on-line after being down for more than twenty-four hours. The correct ephemeris data is provided without waiting for the ephemeris buffers for the respective satellites view of the GBAS station to be filled with at least twenty-fours of data.

Figure 6:
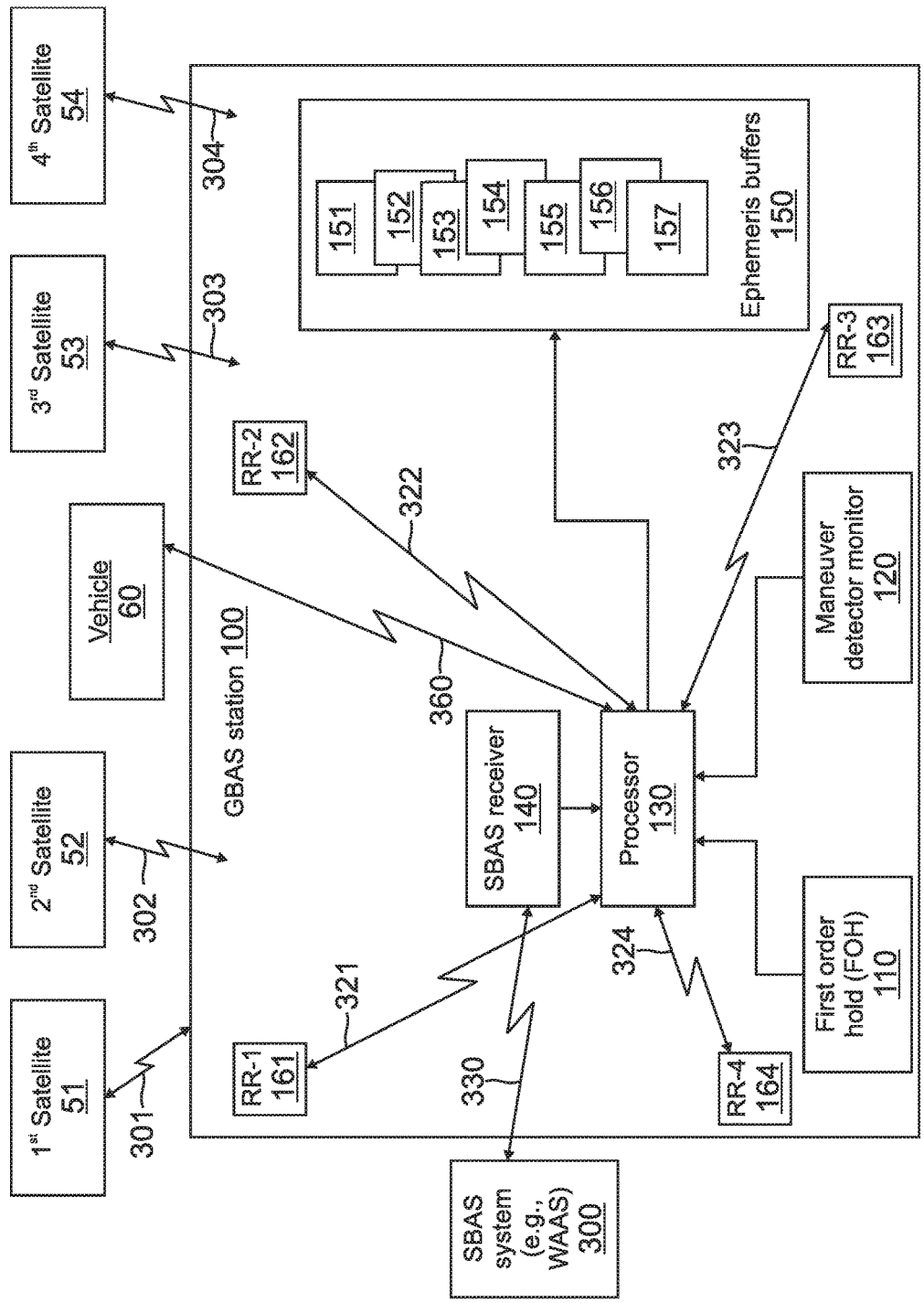
FIG. 6 shows an embodiment of a GBAS station that is coming back on-line after being off-line for over forty-eight hours.
Figure 7:
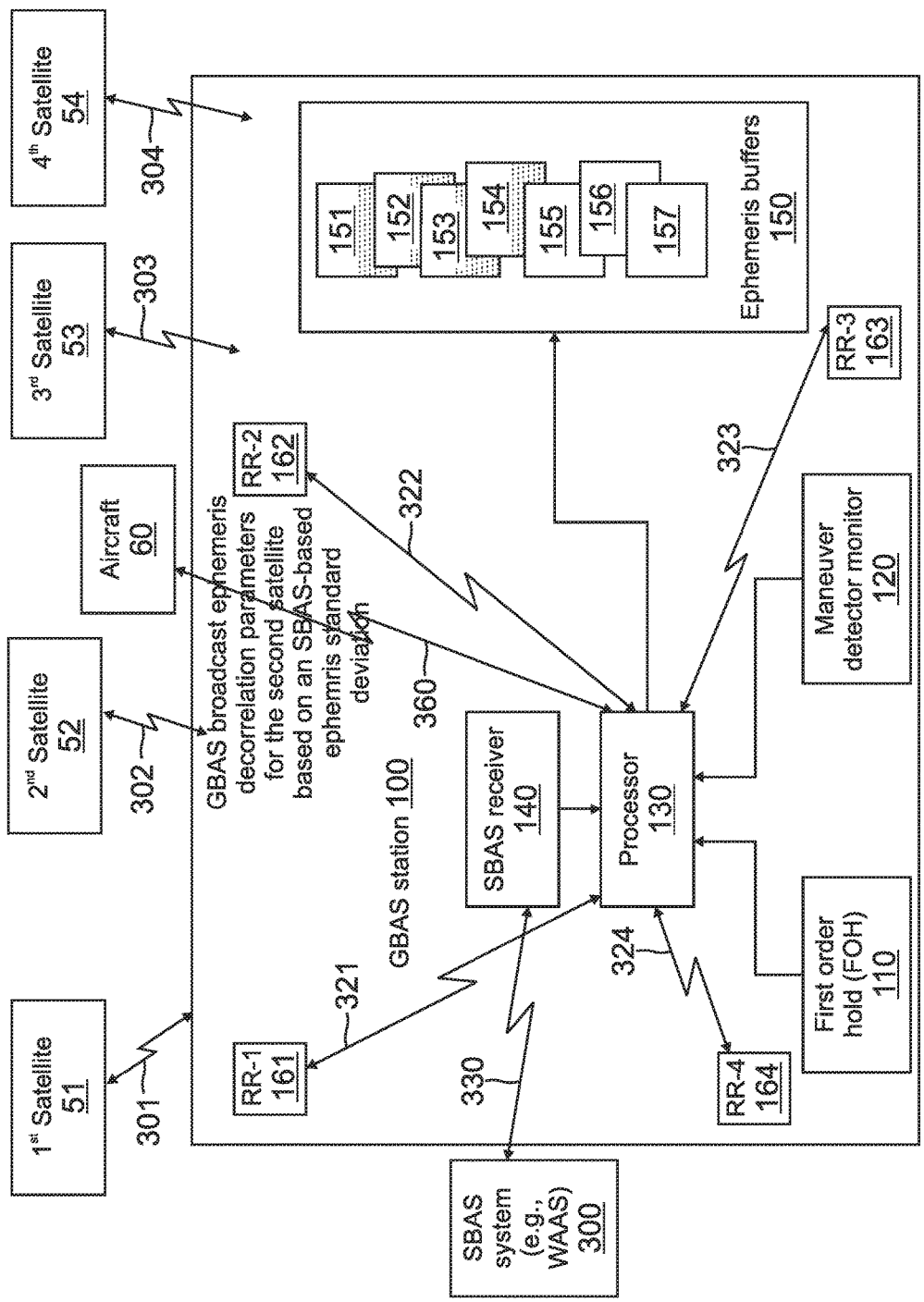
FIG. 7 shows an embodiment of a GBAS station of FIG. 6 in which the ephemeris buffer for the satellites in view of the GBAS station are being filled while the GBAS station broadcasts GBAS broadcast ephemeris decorrelation parameters for the satellites in view of the GBAS station based on an SBAS ephemeris standard deviation in accordance with the present application.

This embodiment is shown in FIGS. 6 and 7. FIG. 6 shows an embodiment of a GBAS station 100 that is coming back on-line after being off-line for over forty-eight hours. All the ephemeris buffers 151-157 have been flushed and are empty. FIG. 7 shows an embodiment of the GBAS station 100 of FIG. 6 in which the ephemeris buffers 151-154 for the satellites 51-54 in view of the GBAS station 100 are being filled while the GBAS station broadcasts GBAS broadcast ephemeris decorrelation parameters for the satellites 51-54 in view of the GBAS station based on an SBAS ephemeris standard deviation in accordance with the present application. As shown in FIG. 7, the ephemeris buffers 151-154 are partially filled as shown by the cross-hatching filling a portion of the ephemeris buffers 151-154. The ephemeris buffers 155-156 are still empty, since the GBAS station 100 has not input any data from the associated satellites that are not in view of the GBAS station 100. Those ephemeris buffers will be filled when the associated satellites move into view of the GBAS station 100. While the ephemeris buffers 155-157 are being filled over the next forty-eight hours, GBAS station broadcasts GBAS broadcast ephemeris decorrelation parameters for the satellites in view of the GBAS station 100 based on an SBAS ephemeris standard deviation in accordance with the present application.

In all these embodiments, the SBAS ephemeris information received by the SBAS receiver 140 in the GBAS station 100 is used to reduce the time required to introduce a new satellite, to reintroduce a satellite in view of the GBAS station, or to bring a GBAS station on-line after being down for more than twenty-four hours.

In prior art systems when either the FOH or MDM are tripped (i.e., triggered), the GBAS station assumes the associated satellite is faulty and responds by flushing the ephemeris buffer for the satellite and either: 1) preventing a broadcast of the differential correction information for the satellite on which the monitor tripped; or 2) flagging the differential correction information that is broadcast for the satellite on which the monitor tripped so the vehicles in the vicinity do not use the flagged broadcast differential correction information for that satellite.

The process of blocks 212, 214, 216, and 218 in method 200 are optional. In the embodiment in which blocks 212-218 are not implemented, when the FOH or MDM are tripped the ephemeris buffer for the satellite on which the monitor tripped is flushed. At block 212, when a triggering of monitors of GBAS ephemeris data indicates the GBAS ephemeris data for a first satellite is faulty, the GBAS station 100 determines if the triggering indicates a true ephemeris failure for a faulty-first satellite, or if the triggering indicates the ephemeris failure is a false ephemeris failure (block 214).

In one implementation of this embodiment, the GBAS station 100 determines if the ephemeris failure is a true or false ephemeris failure by comparing the SBAS ephemeris data consumed from the industry-standard message type with the GBAS ephemeris data obtained from the at least four reference receivers 161-164 in the GBAS station 100. The monitors 110/120 in the GBAS ground station are designed to meet specific "true alert" (also referred to as integrity) requirements and "false alert" (also referred to as continuity) requirements. The monitor algorithms and thresholds are designed to meet specific integrity/continuity requirements given an ephemeris uncertainty. This ephemeris uncertainty is based on an expected range for the actual ephemeris uncertainty (1-sigma) values that may be experienced during real-time operation of the system GNSS and GBAS station 100.

If the GBAS station 100 determines at block 214 that the triggering indicates a true ephemeris failure for a faulty satellite (e.g., a faulty-first satellite 51) the flow of method 200 proceeds to block 216. At block 216, the exclusion of the faulty-first satellite 51 is prevented by using the SBAS ephemeris data consumed from the industry-standard message type to transmit the GBAS broadcast ephemeris decorrelation parameters for the first satellite. In this case, the ephemeris buffer 151 (e.g., a first ephemeris buffer 151) for the faulty-first satellite 51 is flushed, but data associated with the faulty-first satellite 51 is not excluded from the GBAS broadcast ephemeris decorrelation parameters for the first satellite. Once the ephemeris buffer 251 of the faulty-first satellite is flushed, the GBAS station 100 monitors the SBAS ephemeris data from the industry-standard message type associated with the faulty-first satellite while refilling the ephemeris buffer for the faulty-first satellite 51.

If the GBAS station 100 determines at block 214 that the triggering indicates a false ephemeris failure for a satellite the flow of method 200 proceeds to block 218. At block 218, flushing of a (first) ephemeris buffer of the first satellite is prevented. In one implementation of this embodiment, the processor 130 makes the determination at block 214.

Thus, the GBAS stations 100 described herein include an integrated SBAS receiver 140 that consumes an industry-standard message type (e.g., a Message Type (MT) 28) and outputs ephemeris uncertainty data from the SBAS system 300 to the processor 130. The processor 130 processes the ephemeris uncertainty data input from the SBAS receiver 140 to generate SBAS-based ephemeris decorrelation parameter from the ephemeris uncertainty data. In this manner, the GBAS broadcast ephemeris decorrelation parameter is based on the uncertainty from industry-standard message type and the assumed distance of the airborne user from the ground station (typically 10 km for aircraft vehicles). The GBAS station 100 reduces the P-value, which allows for improved integrity bounding greater distance from the GBAS 100 and uses SBAS validated ephemeris while filling the ephemeris buffers used in FOH 110 and MDMs 120 so a reintroduced satellite is available 2 days sooner than it would be in a prior art system.

Figure 8:
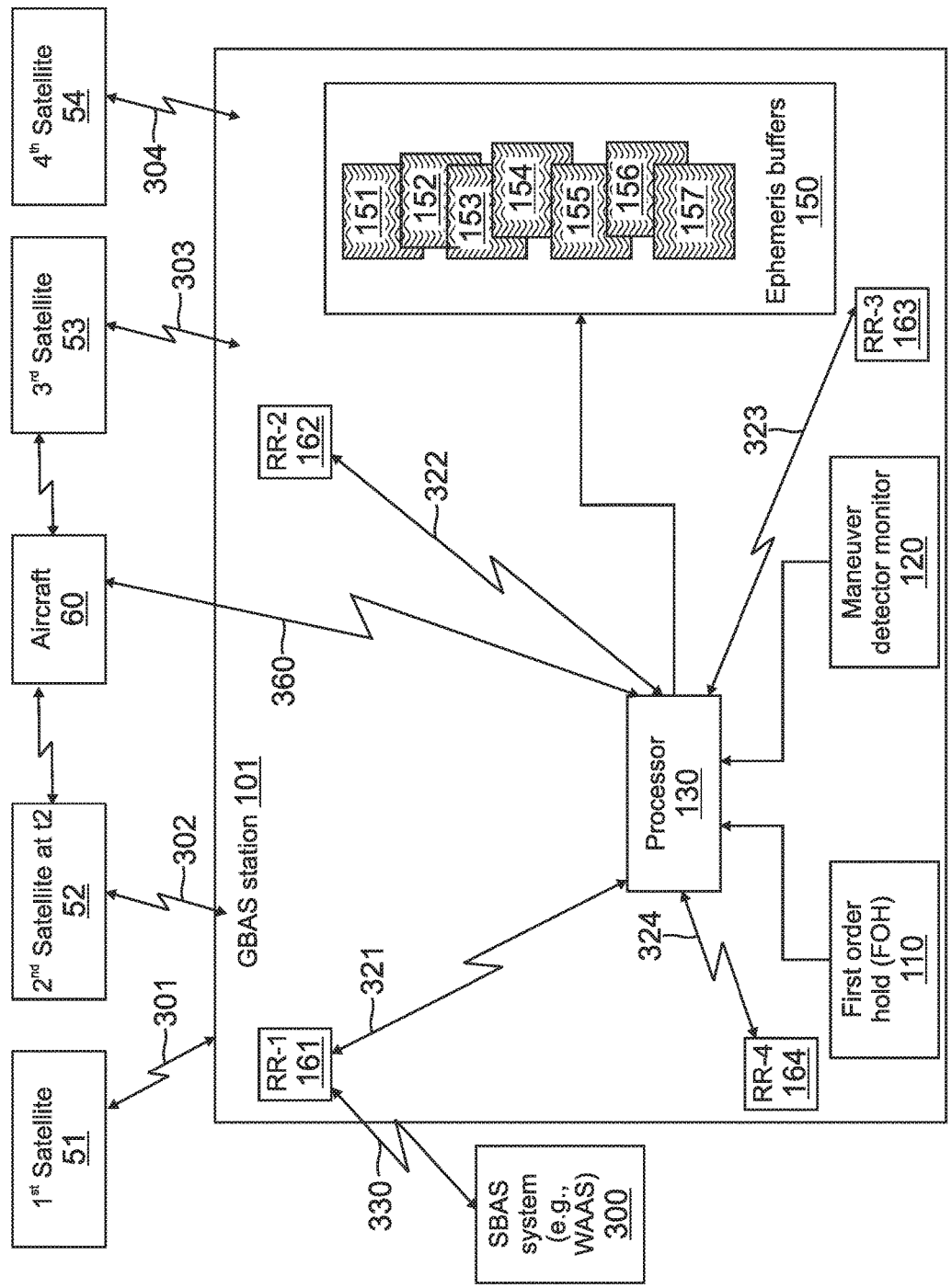
FIG. 8 shows an embodiment of a GBAS station in accordance with the present application.

FIG. 8 shows an embodiment of a GBAS station 101 in accordance with the present application. The GBAS station 101 differs from the GBAS station 100 of FIG. 1 in that the first reference receiver 171 functions as the SBAS receiver. The first reference receiver 171 that functions as the SBAS receiver is referred to herein as a "RR/SBAS receiver 171". The SBAS system 300 is communicatively coupled via communication link 371 to the RR/SBAS receiver 171. In this case, the RR/SBAS receiver 171 sends the GBAS and SBAS data to the processor 130. The rest of components in the GBAS station 101 function as described above with reference to FIGS. 1-7.

Figure 9:
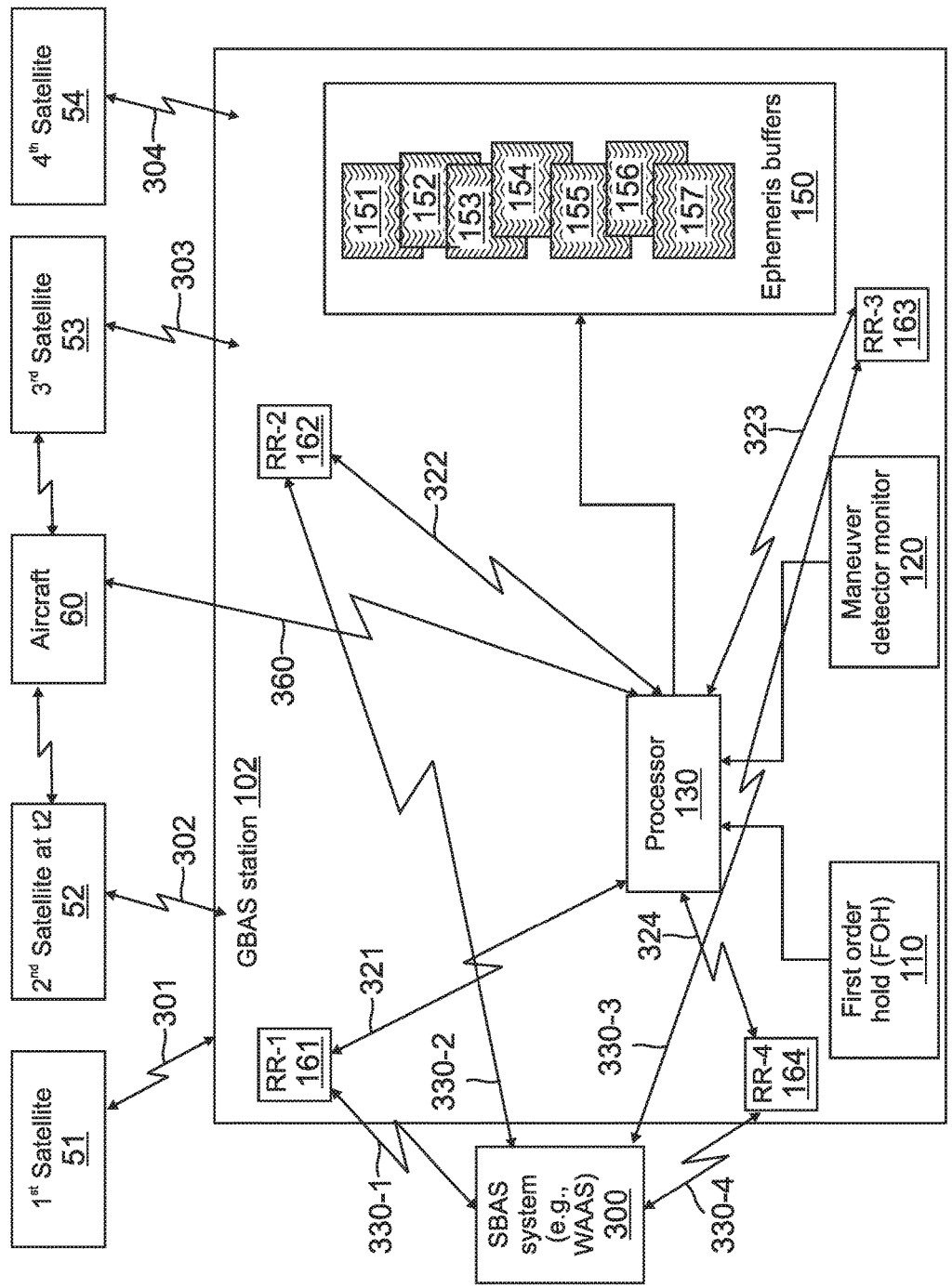
FIG. 9 shows an embodiment of a GBAS station in accordance with the present application.

FIG. 9 shows an embodiment of a GBAS station 102 in accordance with the present application. The GBAS station 102 differs from the GBAS station 100 of FIG. 1 in that the reference receivers 171-174 function in combination as the SBAS receiver 171. The first reference receivers 171-174 that function in combination as the SBAS receiver is referred to herein as a "RRs/SBAS receiver 171-174". The SBAS system 300 is communicatively coupled via communication links 371-374 to the respective reference receivers 171-174. In this case, the RRs/SBAS receiver 171-174 sends the GBAS and SBAS data to the processor 130. The rest of components in the GBAS station 102 function as described above with reference to FIGS. 1-7.

The processor 130 includes or functions with software programs, firmware or other computer readable instructions for carrying out various methods, process tasks, calculations, and control functions, used in the functions provided in method 200.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EE-PROM), and flash memory, etc. Suitable processor-readable media may also include transmission media such as electrical, electromagnetic, or digital signals, conveyed via a communication medium such as a network and/or a wireless link.

EXAMPLE EMBODIMENTS

Example 1 includes a method of using space based augmentation system (SBAS) ephemeris data in conjunction with a ground based augmentation systems (GBAS) station, the method comprising: integrating a space based augmentation system (SBAS) receiver in the GBAS station; receiving an industry-standard message type via the SBAS receiver at the GBAS station, the industry-standard message type including SBAS ephemeris data associated with satellites in a global navigation satellite system (GNSS); consuming, at the GBAS station, the SBAS ephemeris data from the industry-standard message type associated with satellites in view of the GBAS station and based on the consuming: improving error bounds to GBAS broadcast ephemeris decorrelation parameters broadcast from the GBAS station; and reducing time to reintroduce a satellite in the GNSS.

Example 2 includes the method of Example 1, wherein improving the error bounds to the GBAS broadcast ephemeris decorrelation parameters broadcast from the GBAS station comprises decreasing a P-value broadcast from the GBAS station.

Example 3 includes the method of any of Examples 1-2, wherein improving the error bounds to the GBAS broadcast ephemeris decorellation decorrelation parameters broadcast from the GBAS station comprises: using an SBAS ephemeris standard deviation in the SBAS ephemeris data from the industry-standard message type to compute an SBAS minimum detectible error; computing an SBAS P-value using the computed SBAS minimum detectible error; comparing the SBAS P-value to a GBAS P-value; and broadcasting the smaller P-value from the GBAS station based on the comparison.

Example 4 includes the method of any of Examples 1-3, wherein determining if the triggering indicates the true ephemeris failure for the faulty-first satellite comprises: determining if an SBAS ephemeris standard deviation from the clock-ephemeris covariance matrix data in the industry-standard message type exceeds a preselected threshold.

Example 5 includes the method of any of Examples 1-4, when a triggering of monitors of GBAS ephemeris data indicates the GBAS ephemeris data for a first satellite is faulty, the method further comprises: determining if the triggering indicates a true ephemeris failure for a faulty-first satellite, wherein, if the triggering indicates the ephemeris failure is a true ephemeris failure, the method comprises: preventing exclusion of the faulty-first satellite by using the SBAS ephemeris data consumed from the industry-standard message type to transmit the GBAS broadcast ephemeris decorrelation parameters for the first satellite, and wherein, if the triggering indicates a false ephemeris failure, the method comprises: preventing flushing of an ephemeris buffer of the first satellite.

Example 6 includes the method of Example 5, wherein preventing exclusion of the faulty-first satellite by using the SBAS ephemeris data consumed from the industry-standard message type to transmit the GBAS broadcast ephemeris decorrelation parameters for the first satellite comprises: flushing the ephemeris buffer of the faulty-first satellite; monitoring the SBAS ephemeris data from the industry-standard message type associated with the faulty-first satellite while refilling the ephemeris buffer for the faulty-first satellite; computing GBAS broadcast ephemeris decorrelation parameters for the faulty-first satellite based on an SBAS ephemeris standard deviation from the industry-standard message type associated with the faulty-first satellite; and broadcasting the SBAS-based ephemeris decorellation parameters from the GBAS station.

Example 7 includes the method of any of Examples 1-6, wherein reducing time to reintroduce the satellite in the GNSS comprises: determining a second satellite is being reintroduced in the GBAS station; filling a previously-flushed ephemeris buffer associated with the second satellite with data associated with the second satellite input from four reference receivers in the GBAS station; and computing GBAS broadcast ephemeris decorrelation parameters for the second satellite based on an SBAS ephemeris standard deviation from the industry-standard message type while the ephemeris buffer associated with the second satellite is being filled.

Example 8 includes the method of Example 7, further comprising: if an error is detected in the GBAS broadcast ephemeris decorrelation parameters for the second satellite, preventing data from the second satellite from being used by a vehicle communicatively coupled to the GBAS station.

Example 9 includes the method of Example 8, wherein preventing data from the second satellite from being used by the vehicle comprises: ending a broadcasting of the GBAS broadcast ephemeris decorrelation parameters for the second satellite.

Example 10 includes the method of any of Examples 1-9, further comprising, based on the consuming, reducing time to bring a first GBAS station on-line in the GNSS.

Example 11 includes the method of Example 10, wherein reducing the time to bring the first GBAS station on-line in the GNSS comprises: filling at least one ephemeris buffer in the first GBAS station with the consumed ephemeris data, input from four reference receivers in the first GBAS station and associated with at least one satellite in view of the first GBAS station; and computing GBAS broadcast ephemeris decorrelation parameters for the second satellite based on an SBAS ephemeris standard deviation from the industry-standard message type associated including the SBAS ephemeris data associated with the at least one satellite in view of the first GBAS station.

Example 12 includes the method of Example 11, further comprising: if an error is detected in the GBAS broadcast ephemeris decorrelation parameters for one of the at least one satellite, preventing data from the faulty satellite from being used by a vehicle communicatively coupled to the first GBAS station.

Example 13 includes the method of any of Examples 1-12, further comprising, based on the consuming, reducing time to bring a new satellite on-line in the GNSS.

Example 14 includes the method of Example 13, wherein reducing the time to bring a new satellite on-line in the GNSS comprises: filling at least one ephemeris buffer, associated with the new satellite, with the consumed ephemeris data, input from four reference receivers in the GBAS station and associated with the new satellite; computing GBAS broadcast ephemeris decorrelation parameters for the new satellite based on an SBAS ephemeris standard deviation from the industry-standard message type associated including the SBAS ephemeris data associated with the new satellite; and if an error is detected in the GBAS broadcast ephemeris decorrelation parameters for the new satellite, preventing data from the faulty-new satellite from being used by a vehicle communicatively coupled to the GBAS station.

Example 15 includes the method of any of Examples 1-14, wherein receiving an industry-standard message type comprises receiving a message type Example 28.

Example 16 includes a ground based augmentation system (GBAS) station comprising: at least one processor to compute GBAS broadcast ephemeris decorrelation parameters for satellites in a Global Navigation Satellite System (GNSS) based on a space based augmentation system (SBAS) ephemeris standard deviation input to the at least one processor from an industry-standard message type, wherein the industry-standard message type includes SBAS ephemeris data associated with satellites and an assumed distance to the respective satellites, and; at least four GBAS reference receivers communicatively coupled to the at least one processor; and at least one monitor to detect ephemeris fault threats, the at least one monitor communicatively coupled to the at least one processor, wherein the GBAS station is configured to consume the industry-standard message type to: improve error bounds to GBAS broadcast ephemeris decorrelation parameters broadcast from the GBAS station; reduce time to reintroduce a satellite in the GNSS; and monitor GBAS ephemeris data based on consuming the industry-standard message type.

Example 17 includes the system of Example 16, further comprising: a space based augmentation system (SBAS) receiver communicatively coupled with the at least one processor and configured to consume and receive the industry-standard message type.

Example 18 includes the system of any of Examples 16-17, wherein at least one of the at least four GBAS reference receivers that is configured to consume and receive the industry-standard message type.

Example 19 includes the system of any of Examples 16-18, wherein the at least one monitor to detect ephemeris fault threats include at least one of a first order hold (FOH) and at least one maneuver detector monitor.

Example 20 includes a ground based augmentation system (GBAS) station comprising: at least one processor to compute GBAS broadcast ephemeris decorrelation parameters for satellites in a Global Navigation Satellite System (GNSS) based on a space based augmentation system (SBAS) ephemeris standard deviation from an industry-standard message type from a SBAS, wherein the industry-standard message type includes SBAS ephemeris data associated with satellites and an assumed distance to the respective satellites, and; at least four GBAS reference receivers communicatively coupled to the at least one processor; a space based augmentation system (SBAS) receiver communicatively coupled with the at least one processor and configured to consume and receive the industry-standard message type; and at least one monitor to detect ephemeris fault threats, the at least one monitor communicatively coupled to the at least one processor, wherein the GBAS station is configured to consume the industry-standard message type to: improve error bounds to GBAS broadcast ephemeris decorrelation parameters broadcast from the GBAS station; reduce time to reintroduce a satellite in the GNSS; and monitor GBAS ephemeris data based on consuming the industry-standard message type.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of using space based augmentation system (SBAS) ephemeris data in conjunction with a ground based augmentation systems (GBAS) station, the method comprising:
integrating a space based augmentation system (SBAS) receiver in the GBAS station;
receiving an industry-standard message type via the SBAS receiver at the GBAS station, the industry-standard message type including SBAS ephemeris data associated with satellites in a global navigation satellite system (GNSS);
consuming, at the GBAS station, the SBAS ephemeris data from the industry-standard message type associated with satellites in view of the GBAS station and based on the consuming:
improving error bounds to GBAS broadcast ephemeris decorrelation parameters broadcast from the GBAS station; and
reducing time to reintroduce a satellite in the GNSS.

2. The method of claim 1, wherein improving the error bounds to the GBAS broadcast ephemeris decorrelation parameters broadcast from the GBAS station comprises decreasing a P-value broadcast from the GBAS station.

3. The method of claim 1, wherein improving the error bounds to the GBAS broadcast ephemeris decorrelation parameters broadcast from the GBAS station comprises:
using an SBAS ephemeris standard deviation in the SBAS ephemeris data from the industry-standard message type to compute an SBAS minimum detectible error;
computing an SBAS P-value using the computed SBAS minimum detectible error;
comparing the SBAS P-value to a GBAS P-value; and
broadcasting the smaller P-value from the GBAS station based on the comparison.

4. The method of claim 1, further comprising: determining if a triggering indicates a true ephemeris failure for a faulty-first satellite by determining if an SBAS ephemeris standard deviation from the clock-ephemeris covariance matrix data in the industry-standard message type exceeds a preselected threshold.

5. The method of claim 1, when a triggering of monitors of GBAS ephemeris data indicates the GBAS ephemeris data for a first satellite is faulty, the method further comprises:
determining if the triggering indicates a true ephemeris failure for a faulty-first satellite,
wherein, if the triggering indicates the ephemeris failure is a true ephemeris failure, the method comprises:
preventing exclusion of the faulty-first satellite by using the SBAS ephemeris data consumed from the industry-standard message type to transmit the GBAS broadcast ephemeris decorrelation parameters for the first satellite, and
wherein, if the triggering indicates a false ephemeris failure, the method comprises:
preventing flushing of an ephemeris buffer of the first satellite.

6. The method of claim 5, wherein preventing exclusion of the faulty-first satellite by using the SBAS ephemeris data consumed from the industry-standard message type to transmit the GBAS broadcast ephemeris decorrelation parameters for the first satellite comprises:
flushing the ephemeris buffer of the faulty-first satellite;
monitoring the SBAS ephemeris data from the industry-standard message type associated with the faulty-first satellite while refilling the ephemeris buffer for the faulty-first satellite;
computing GBAS broadcast ephemeris decorrelation parameters for the faulty-first satellite based on an SBAS ephemeris standard deviation from the industry-standard message type associated with the faulty-first satellite; and
broadcasting the SBAS-based ephemeris decorrelation parameters from the GBAS station.

7. The method of claim 1, wherein reducing time to reintroduce the satellite in the GNSS comprises:
determining a second satellite is being reintroduced in the GBAS station;
filling a previously-flushed ephemeris buffer associated with the second satellite with data associated with the second satellite input from four reference receivers in the GBAS station; and
computing GBAS broadcast ephemeris decorrelation parameters for the second satellite based on an SBAS ephemeris standard deviation from the industry-standard message type while the ephemeris buffer associated with the second satellite is being filled.

8. The method of claim 7, further comprising:
if an error is detected in the GBAS broadcast ephemeris decorrelation parameters for the second satellite, preventing data from the second satellite from being used by a vehicle communicatively coupled to the GBAS station.

9. The method of claim 8, wherein preventing data from the second satellite from being used by the vehicle comprises:
ending a broadcasting of the GBAS broadcast ephemeris decorrelation parameters for the second satellite.

10. The method of claim 1, further comprising, based on the consuming, reducing time to bring a first GBAS station on-line in the GNSS.

11. The method of claim 10, wherein reducing the time to bring the first GBAS station on-line in the GNSS comprises:
filling at least one ephemeris buffer in the first GBAS station with the consumed ephemeris data, input from four reference receivers in the first GBAS station and associated with at least one satellite in view of the first GBAS station; and
computing GBAS broadcast ephemeris decorrelation parameters for the second satellite based on an SBAS ephemeris standard deviation from the industry-standard message type associated including the SBAS ephemeris data associated with the at least one satellite in view of the first GBAS station.

12. The method of claim 11, further comprising:
if an error is detected in the GBAS broadcast ephemeris decorrelation parameters for one of the at least one satellite, preventing data from the faulty satellite from being used by a vehicle communicatively coupled to the first GBAS station.

13. The method of claim 1, further comprising, based on the consuming, reducing time to bring a new satellite on-line in the GNSS.

14. The method of claim 13, wherein reducing the time to bring a new satellite on-line in the GNSS comprises:
filling at least one ephemeris buffer, associated with the new satellite, with the consumed ephemeris data, input from four reference receivers in the GBAS station and associated with the new satellite;

computing GBAS broadcast ephemeris decorrelation parameters for the new satellite based on an SBAS ephemeris standard deviation from the industry-standard message type associated including the SBAS ephemeris data associated with the new satellite; and if an error is detected in the GBAS broadcast ephemeris decorrelation parameters for the new satellite, preventing data from the faulty-new satellite from being used by a vehicle communicatively coupled to the GBAS station.

15. The method of claim 1, wherein receiving an industry-standard message type comprises receiving a message type 28.

16. A ground based augmentation system (GBAS) station comprising:

at least one processor to compute GBAS broadcast ephemeris decorrelation parameters for satellites in a Global Navigation Satellite System (GNSS) based on a space based augmentation system (SBAS) ephemeris standard deviation input to the at least one processor from an industry-standard message type, wherein the industry-standard message type includes SBAS ephemeris data associated with satellites and an assumed distance to the respective satellites, and;

at least four GBAS reference receivers communicatively coupled to the at least one processor; and at least one monitor to detect ephemeris fault threats, the at least one monitor communicatively coupled to the at least one processor, wherein the GBAS station is configured to consume the industry-standard message type to:

improve error bounds to GBAS broadcast ephemeris decorrelation parameters broadcast from the GBAS station;

reduce time to reintroduce a satellite in the GNSS; and monitor GBAS ephemeris data based on consuming the industry-standard message type.

17. The system of claim 16, further comprising:

a space based augmentation system (SBAS) receiver communicatively coupled with the at least one processor and configured to consume and receive the industry-standard message type.

18. The system of claim 16, wherein at least one of the at least four GBAS reference receivers that is configured to consume and receive the industry-standard message type.

19. The system of claim 16, wherein the at least one monitor to detect ephemeris fault threats include at least one of a first order hold (FOH) and at least one maneuver detector monitor.

20. A ground based augmentation system (GBAS) station comprising:

at least one processor to compute GBAS broadcast ephemeris decorrelation parameters for satellites in a Global Navigation Satellite System (GNSS) based on a space based augmentation system (SBAS) ephemeris standard deviation from an industry-standard message type from a SBAS, wherein the industry-standard message type includes SBAS ephemeris data associated with satellites and an assumed distance to the respective satellites, and;

at least four GBAS reference receivers communicatively coupled to the at least one processor;

a space based augmentation system (SBAS) receiver communicatively coupled with the at least one processor and configured to consume and receive the industry-standard message type; and at least one monitor to detect ephemeris fault threats, the at least one monitor communicatively coupled to the at least one processor, wherein the GBAS station is configured to consume the industry-standard message type to:

improve error bounds to GBAS broadcast ephemeris decorrelation parameters broadcast from the GBAS station;

reduce time to reintroduce a satellite in the GNSS; and monitor GBAS ephemeris data based on consuming the industry-standard message type.

* * * * *